United States Patent [19]

Sasaki et al.

[11] Patent Number: 5,464,248

[45] Date of Patent: Nov. 7, 1995

[54] ALKALI METAL AZIDE PARTICLES

[75] Inventors: Masanori Sasaki, Tokyo; Hiroshi Shibafuchi, Uozu; Yasushi Imai, Mitaka; Masahiko Yoshida, Tokyo; Takehiko Yoshie, Uozu, all of Japan

[73] Assignee: Nippon Carbide Kogyo Kabushiki Kaisha, Tokyo, Japan

[21] Appl. No.: 8,990

[22] Filed: Jan. 26, 1993

[30] Foreign Application Priority Data

Feb. 6, 1992 [JP] Japan .................................. 4-054108

[51] Int. Cl.$^6$ .................................................. C01B 21/08
[52] U.S. Cl. ........................... 280/741; 149/35; 159/48.1; 423/410
[58] Field of Search .............................. 423/410; 149/35; 159/48.1; 280/741

[56] References Cited

U.S. PATENT DOCUMENTS

| | | |
|---|---|---|
| 1,628,380 | 5/1927 | Wilcoxon et al. . |
| 4,758,287 | 7/1988 | Pietz ............................................. 149/2 |
| 5,019,220 | 5/1991 | Taylor et al. . |
| 5,074,940 | 12/1991 | Ochi et al. . |
| 5,143,567 | 9/1992 | Taylor et al. ............................. 149/35 |

FOREIGN PATENT DOCUMENTS

| | | |
|---|---|---|
| 0458439 | 11/1991 | European Pat. Off. . |
| 1144243 | 2/1963 | Germany . |

Primary Examiner—Wayne Langel
Attorney, Agent, or Firm—Sherman and Shalloway

[57] ABSTRACT

Alkali metal azide particles most of which have a nearly spherical shape and take a spongy structure and whose volume average particle size ratio in the ultrasonic dispersion treatment is desirously 0.4 or less. Since self-decomposition characteristics of the alkali metal azide particles according to this invention are quite mild, they can be simply handled in large amounts and are quite useful as a gas generating agent for an automobile air bag.

18 Claims, 3 Drawing Sheets

ALKALI METAL AZIDE PARTICLES

DETAILED DESCRIPTION OF THE INVENTION

1. Field of Invention

This invention relates to particles of an alkali metal azide which are quite useful as main starting materials for tetrazoles which are starting materials of medicines, photographic agents, etc. and as a gas generating agent for an air bag which is an automobile safety device, and a process for producing the same. More specifically, this invention relates to alkali metal azide particles which are easy to produce and less dangerous to handle, and which take a nearly spherical shape and have a spongy structure.

2. Prior Art

A process for producing an alkali metal azide has been so far known. For example, U.S. Pat. No. 1,628,380 involves a process in which the reaction of hydrazine and an alkyl nitrite is carried out in a hydrous reaction medium or substantially in an anhydrous reaction medium. West German Patent No. 1,144,243 describes a process in which the reaction of sodium amide and nitrous oxide is performed in aqueous ammonia.

The alkali metal azides afforded by these ordinary processes, however, generally take the plate-like crystal shape or are the mass agglomerates, having vigorous self-decomposition characteristics; they come under class 5, group 1 of dangerous articles in the Fire Law in Japan, and their handling undergoes quite strict regulation. In consequence, there are problems that a huge investment is needed in equipment in order to treat large amounts of alkali metal azides, and quantities, package mode, etc. are severely controlled in transportation of products.

Further, the alkali metal azides obtained by the ordinary processes generally have the average particle size of 50 microns or more; since alkali metal azide fine particles having an average particle size of 30 microns or less are commonly used as a gas generating agent for air bags in particular, a pulverization step is inevitable, and a special contrivance is needed in a device from the aspect of safety. Thus, the alkali metal azides easy of pulverization have been demanded even when self-decomposition characteristics are mild and further pulverization is required.

SUMMARY OF THE INVENTION

The present inventors have made investigations to greatly improve the vigorous self-decomposition characteristics of the usual alkali metal azides and obtain an alkali metal azide having mild self-decomposition characteristics. Consequently, they have found that, for example, alkali metal azide particles formed by, for example, spray-drying e.g. a commercial alkali metal azide in an aqueous solvent take a nearly spherical particle shape and have a spongy structure, and the alkali metal azide of such a shape has quite mild self-decomposition characteristics. This finding has led to completion of this invention.

DETAILED DESCRIPTION OF THE INVENTION

According to this invention, there are provided alkali metal azide particles, most of which take a nearly spherical shape and have a spongy structure.

The word "most" here referred to means 70% by weight or more, preferably 80% by weight or more, most preferably 90% by weight or more.

Figure 1:
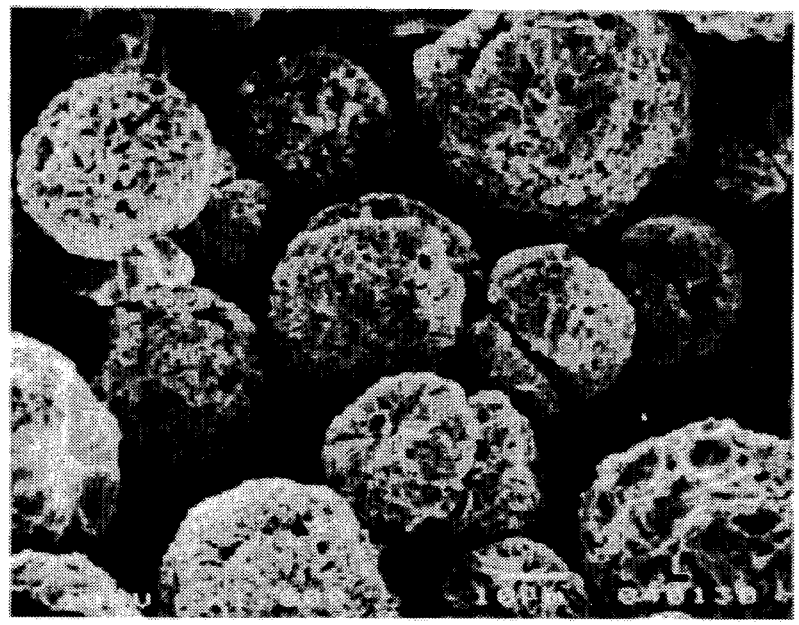
FIG. 1 is a photo of a scanning-type electron microscope (1,000 X) for sodium azide particles of this invention.
Figure 2:
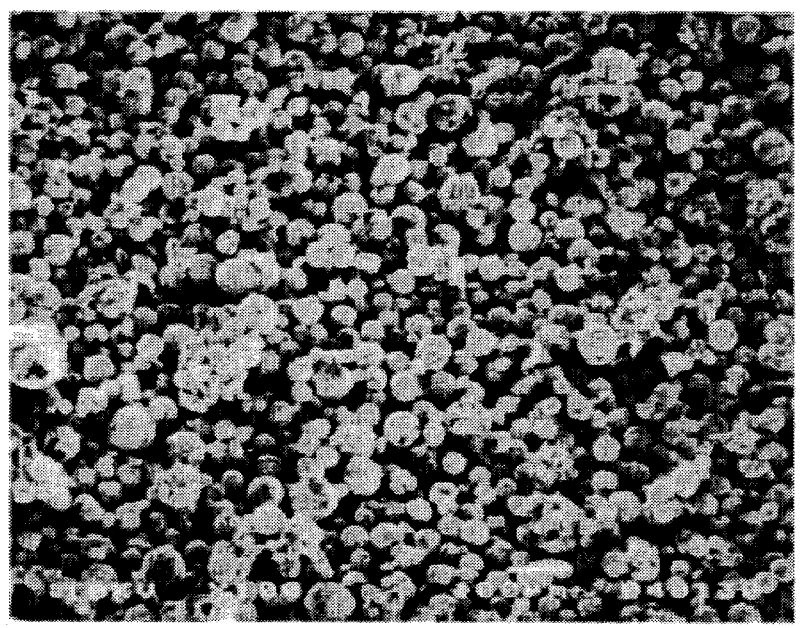
FIG. 2 is a photo of a scanning-type electron microscope (100 X) for sodium azide particles of this invention.
Figure 3:
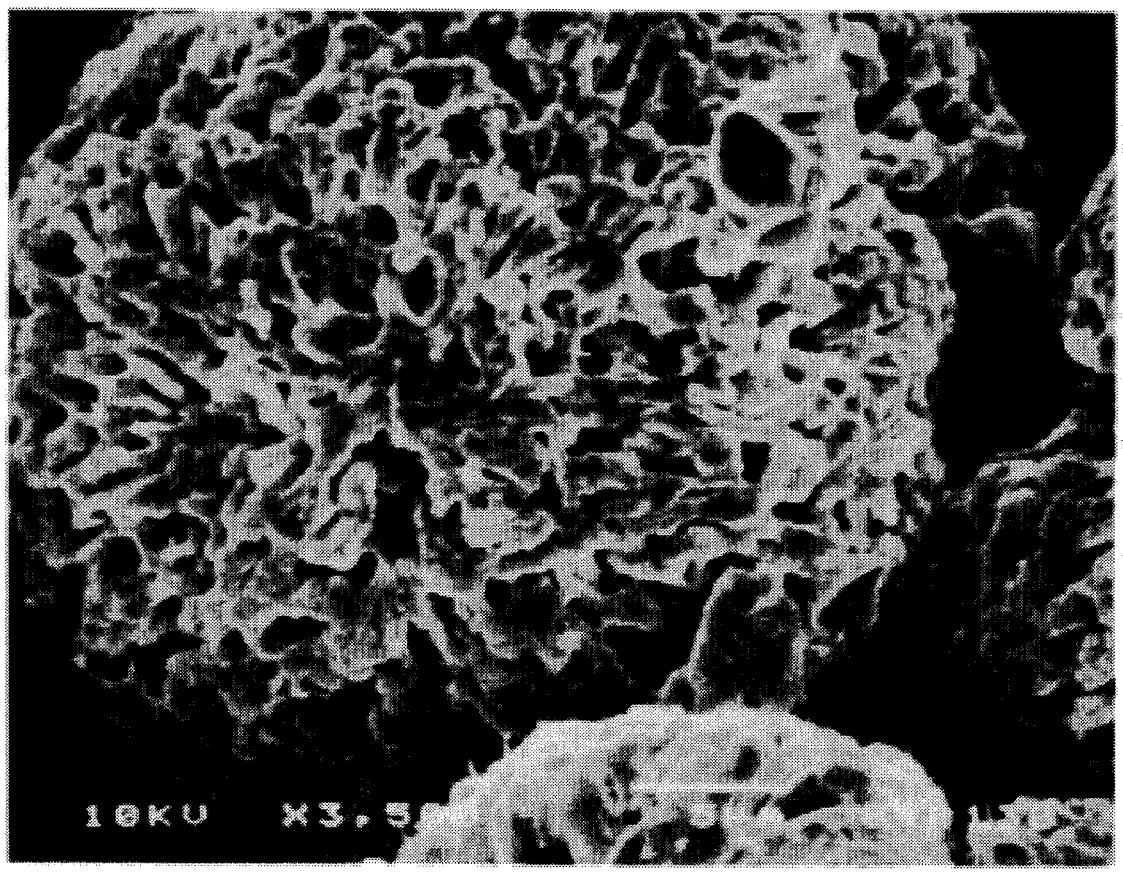
FIG. 3 is a photo of a scanning-type electron microscope (3,500 X) for sodium azide particles of this invention.

The alkali metal azide particles in this invention take, as shown in photos of a scanning-type electron microscope in FIGS. 1 to 3, a spongy structure and at times contain traces of coarse particles; they are chiefly fine particles of a spherical shape and a nearly spherical shape such as an ellipsoidal shape. The particle size is usually about 10 to 500 microns, and the volume average particle size of nearly spherical alkali metal azide fine particles except particles of the different shape is about 10 to 150 microns, especially about 40 to 80 microns. The alkali metal azide particles of such a shape have been altogether unknown before this invention.

Most of the alkali metal azide particles according to this invention take the nearly spherical shape and have the spongy structure; volume average particle size ratio in the ultrasonic dispersion treatment is as low as 0.4 or less, preferably 0.35 or less. The particle size ratio is found as follows. Namely, the alkali metal azide suspended in n-heptane is dipped in an ultrasonic bath and sonicated by an ultrasonic dispersion treatment method which will be described later. A volume average particle size after the treatment is divided by a volume average particle size before the treatment, and the resulting value is the volume average particle size ratio. Accordingly, the lower the particle size ratio, the smaller the particle size tends to become by the ultrasonic dispersion treatment. When the particle size ratio is too high exceeding 0.4, self-decomposition characteristics undesirously tend to be drastic.

In still another embodiment of this invention, the alkali metal azide particles according to this invention have the volume average particle size of 10 to 150 microns, preferably, 20 to 100 microns, more preferably 40 to 80 microns, and the specific surface area, measured by a BET method, of 0.4 to 1.0 $m^2/g$, preferably 0.45 to 0.9 $m^2/g$. When the specific surface area measured by the BET method is as low as less than 0.4 $m^2/g$, the amounts of the particles having the above relatively high particle size ratio tend to increase. When it is as high as more than 1.0 $m^2/g$, the amounts of the particles of the different shape tend to increase. Thus, both cases are unwanted because it is somewhat difficult to pulverize the particles.

Examples of the alkali metal azide in this invention are lithium azide, sodium azide and potassium azide. Of these, sodium azide is most common.

The alkali metal azide particles of this invention can be produced by spray-drying or lyophilization of a solution of the alkali metal azide in an aqueous solvent. The spray-drying is preferable for ease of the production procedure.

The solution of the alkali metal azide in the aqueous solvent can be formed by dissolving a commercial alkali metal azide in an aqueous solvent. The alkali metal azide is not limited in particular; it may take any crystal form and be produced by any method. Purity of the alkali metal azide is usually 97% by weight or higher, preferably 99% by weight or higher.

The solution of the alkali metal azide in the aqueous solvent can desirably be a solution obtained by redissolving in an aqueous solvent wet crystals of the alkali metal azide formed by a method proposed by Applicant of this invention in Japanese Patent Application No. 141948/1992—a method in which hydrazine and an alkyl nitrite are reacted such that hydrazine is in a specific reaction range. The wet crystals are desirable because they have quite high safety in transportation and handling and are less costly without undergoing a drying step.

The concentration of the alkali metal azide in the aqueous solvent solution is any concentration up to a saturated concentration of the alkali metal azide in the aqueous solvent; it is usually 5 to 30% by weight, preferably about 10 to 25% by weight.

The aqueous solvent is a solvent having a water content of 50% by weight or more, preferably 90% by weight or more. The aqueous solvent may contain, besides water, a suitable hydrophilic organic solvent unless impairing the reaction. It is, however, advisable to minimize the organic solvent from the aspects of avoiding risks of firing, explosion, etc. and improving efficiency of production with the use of the aqueous solvent solution of the alkali metal azide in the high concentration.

The aqueous solvent solution of the alkali metal azide may contain a surface active agent as required. The content of the surface active agent is usually 0 to 1% by weight, preferably 0 to 0.5% by weight.

A method for forming the aqueous solvent solution of the alkali metal azide is not limited in particular. It may be formed by charging the aqueous solvent in a suitable vessel, adding thereto commercial alkali metal azide particles or alkali metal azide wet crystals obtained by a method proposed in said Japanese Patent Application No. 141948/1992, further adding a surface active agent, etc. if required, and dissolving the mixture at a temperature of, e.g., about 4° to 30° C. with stirring. When it is used as a gas generating agent for an air bag, incorporation of an alkali component in a small amount is at times required. On that occasion, a desirous amount of the alkali component, e.g., sodium hydroxide can be added to the aqueous solvent solution in advance.

It is advisable that the alkali metal azide particles of this invention are produced by spray-drying the aqueous solvent solution of the alkali metal azide. Spray-drying is usually carried out by spraying the aqueous solvent solution of the alkali metal azide in hot air by a suitable method. For example, a spray dryer is available as a device.

It is desirable that the temperature of the hot air is higher than the boiling point of the aqueous solvent used. However, when it is too high, the alkali metal azide seems likely to decompose just after dried. It is therefore advisable that the temperature of the hot air is lower than the temperature at which decomposition of the alkali metal azide starts.

For instance, when water alone is used as the aqueous solvent, the temperature of the hot air may be about 100° to 280° C., preferably 150° to 250° C., more preferably 180° to 230° C.

The thus obtained alkali metal azide particles have the spongy structure, as noted earlier, and contain several % by weight of coarse particles having a particle size of, e.g., more than 300 microns, which particles are considered to result from drying and solidifying in a scattering port, but the former particles are composed mainly of alkali metal azide fine particles of the spherical shape or the nearly spherical shape such as the ellipsoidal shape. The volume average particle size is generally about 10 to 150 microns; the average particle size of the nearly spherical alkali metal azide fine particles obtained by removing the particles of the different shape by classification, etc. as required is about 20 to 100 microns. By further classification or classification after pulverization as required, the alkali metal azide particles of the desirous particle size can be obtained too.

Since the alkali metal azide particles of this invention have the spongy structure, they are easy to collapse, and particle size retention of the particles by the ultrasonic dispersion treatment in the n-heptane solvent—a ratio of the volume average particle size after the ultrasonic dispersion treatment to the volume average particle size before said treatment—desirably becomes 40% or less. Accordingly, compared to the conventional alkali metal azide, pulverization can be carried out quite easily and safely by only using a mixer, a blender, or the like.

In a preferred embodiment of this invention, the alkali metal azide particles of this invention have, as aforesaid, a volume average particle size of about 10 to 150 microns, especially about 40 to 80 microns, a specific surface area, measured by the BET method, of about 0.4 to 10 $m^2/g$, especially, about 0.45 to 0.9 $m^2$, the shape factor k of a specific surface area of 35 to 100, especially 40 to 80, and the amount of the absorbed oil of about 10 to 24 g/100 g. Meanwhile, particles obtained by pulverizing the commercial alkali metal azide crystals with a jet mill have a volume average particle size of about 14 microns, a specific surface area, measured by the BET method, of aboout 0.59 $m^2/g$, a shape factor k of a specific surface area of about 15, and an amount of an absorbed oil of about 14 g/100 g. From these facts, the alkali metal azide particles of this invention are presumed to have the spongy structure by gathering the agglomerates of fine crystals having a size of, e.g., about 5 to 15 microns.

The alkali metal azide particles of this invention are quite mild in self-decomposition characteristics. Commercial sodium azide particles are now compared with the sodium azide particles taking the nearly spherical shape and having the spongy structure in this invention by the method for measuring the self-decomposition characteristics which will be later described. Then, it follows that the commercial particles come under class 5, group 1 of dangerous articles because the decomposition is vigorous and the rupture disk plate is bursted every time in the test for the self-decomposition characteristics, whereas the particles of this invention come under class 5, group 2 because decomposition is so mild that they require 2 to 6 seconds from the start-up to the end of the decomposition reaction, and the number of bursts in the test for the self-decomposition characteristics is zero.

Consequently, the commercial particles are strictly regulated in quantities and package mode when transporting same, while the particles of this invention are less regulated than the commercial particles because they can be transported in much simpler package mode and in far larger quantities and are easier to handle.

The volume average particle size, the volume average particle size ratio in the ultrasonic dispersion treatment, the amount of the absorbed oil and the self-decomposition characteristics in this invention are measured by the following methods.

The method for measuring the specific surface area by the BET method is described in "Powder Engineering Handbook", pp. 169–183, (1986, compiled by Powder Engineering Academy), and the method for measuring the shape factor k of the specific surface area in "Iwanami Physicochemical Dictionary, 3rd edition", p. 389, left col. The k value is 6 in a sphere and a cube.

Method for Measuring a Volume Average Particle Size

Figure 4:
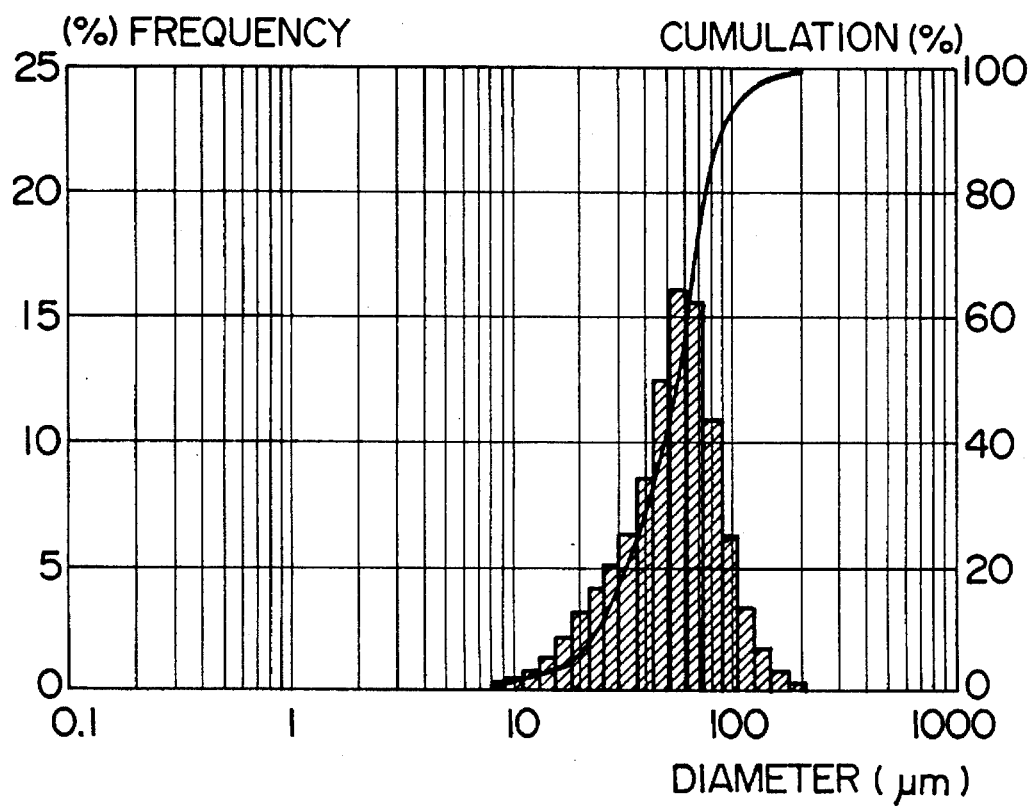
FIG. 4 is a chart showing results of a particle size distribution of sodium azide particles of this invention measured by a laser diffraction-type particle size distribution measuring device.

The measurement is carried out with a particle size distribution measuring device of a laser diffraction type "Microtrac FRA" (a trademark for a machine of Leeds & Northrup) within a particle size measuring range of 0.12 to 704.00 microns. n-Heptane is used as a measuring solvent and SVR (for a small amount of a sample) as a sample circulating device. The sample being measured is charged into a 50 milliliter-beaker in an amount of 0.1 to 0.12 g in case of the average particle size of 50 microns or less and in an amount of 0.25 to 0.35 g in case of the average particle size of about 200 microns. A high-molecular polyester salt dispersant ["DISPARLON KS-873N": a trademark for a product of Kusumoto Kasei K.K.] (4 to 5 droplets) is added by a dropper, and they are well mixed with a microspatula by stirring to form a paste. n-Heptane (about 20 ml) is added to this and well dispersed to form a slurry sample, and the total amount of the sample is charged into the sample circulating device. The particle size distribution is then measured according to the indication on the screen of the device. An example of a chart for the measured results is shown in FIG. 4.

The measured results are treated with a computer in a usual manner to find the volume average particle size.

Method for Measuring a Volume Average Particle Size Ratio in the Ultrasonic Dispersion Treatment An ultrasonic cleaning bath [an oscillator: U0300FB, a bath: U-12, manufactured by Shinmeiji Kogyo K.K.] is used. A 100-milliliter beaker is charged with 50 ml of n-heptane and 10 g of an alkali metal azide sample whose volume average particle size has been measured in advance, and dipped in the ultrasonic cleaning bath filled with water of about 25° C. At this time, the liquid level of the beaker contents is adjusted to be higher than the liquid level of the bath. Ultrasonic shaking is conducted at 26 kHz for 5 minutes, and the volume average particle size of the sample after the ultrasonic dispersion treatment is found according to the above method. The particle size ratio is calculated by the following equation.

$$\text{Volume average particle size ratio} = \frac{\text{Volume average particle size after treatment}}{\text{Volume average particle size before treatment}}$$

Method for Measuring an Amount of an Absorbed Oil

Five grams of an alkali metal azide sample are charged into a 50 milliliter-flask fitted with a suction pipe connected to a dropping tube and a vacuum pump, and about 20 ml of an i-octane solution containing 30% by volume of an olive oil is added under reduced pressure of 5 mmHg, and the mixture is left to stand for 5 to 10 minutes with stirring. Subsequently, the i-octane solution of the olive oil is removed by suction filtration, and the residue is dried at 50° C. under reduced pressure of 10 mmHg for 1 hour. Then, about 2 g of the resulting dried residue is weighed, and extracted with about 100 ml of n-pentane for 20 hours. The extract is weighed and the amount of the absorbed olive oil per 100 g of the alkali metal azide is found by calculation.

Method for Measuring Self-decomposition Characteristics

Figure 5:
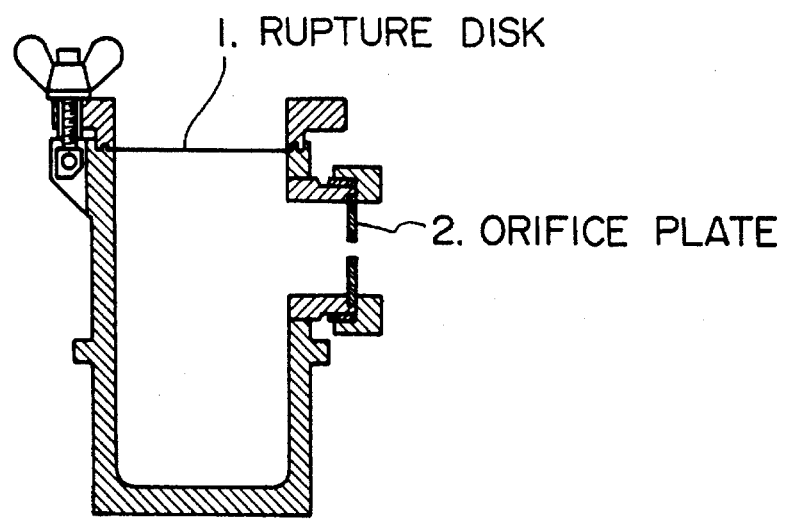
FIG. 5 is a sectional view of a pressure container used to measure self-decomposition characteristics of sodium azide particles in this invention.

Self-decomposition characteristics are measured by a method prescribed in "3. Pressure Container Test" in "Method for Testing Group 5" at pages 66–82 of "Manual for Performing Test of Confirming Dangerous Articles" of the Fire Law in Japan [published by Shin Nippon Hoki Shuppansha K.K. under the supervision of Section of Regulating Dangerous Articles in the Fire Defence Agency], pp. 66–82. This method uses a pressure container shown in FIG. 5 attached hereto. In the drawing, 1 is a rupture disk, and 2 is an orifice plate. In this invention, the test is run with a pressure container having a 9 mm ø orifice plate.

Five grams of the test sample are charged into the given container. The temperature is elevated to 200° C. at a rate of 40°±5° C./min from the time when the sample is charged into the pressure container, and heating further continues up to 400° C. In case the self-decomposition characteristics are mild, the decomposed gas flows out of the orifice when the temperature rises. On the other hand, in case the self-decomposition characteristics are vigorous, the inner pressure rapidly increases, and the rupture disk is bursted.

The test is repeated 10 times on the same test sample. The self-decomposition characteristics are evaluated by the number of bursts of the rupture disk among the 10 tests. According to the Fire Law, the product that is bursted 5 times or more is classified into class 5, group 1 of dangerous articles, and the product that is bursted less than 5 times is classified into class 5, group 2 of dangerous articles.

For reference, regarding a test sample that does not burst, a decomposition time, i.e., a time for which the decomposed gas continuously flows out of the orifice is measured.

The following Referential Example, Examples and Comparative Examples illustrate this invention more specifically.

REFERENTIAL EXAMPLE

A four-necked 20 liter-flask A fitted with a stirrer, a gas blowing tube and a reflux condenser was charged with 6.13 liters (about 8.46 kg, about 74.0 mols) of an aqueous solution containing about 35% by weight of sodium hydroxide and 3.82 liters (about 3.86 kg, about 61.8 tools) of a aqueous solution containing about 51% by weight of hydrazine.

Subsequently, a four-necked 20 liter-flask B fitted with a stirrer and a gas exhaust tube connected to the gas blowing tube of the flask A was charged with 8.63 kg (about 47.5 mols) of an aqueous solution containing about 38% by weight of sodium nitrite and 1.94 liters (about 1.54 kg, about 47.6 mols) of methyl alcohol having purity of about 99% by weight. Dilute sulfuric acid (3.33 liters, about 4.66 kg, about 23.8 mols) having a concentration of about 50% by weight was added by a control feeder with stirring while keeping a temperature at about 25° C., and a methyl nitrite gas generated was gradually sent to the flask A via the exhaust tube.

The flask A was maintained at about 30° C., and the gas generated in the flask B was introduced from the gas blowing tube with vigorous stirring for reaction. It took about 8 hours to add dilute sulfuric acid to the flask B. The reaction in the flask A was finished when 1 hour lapsed from the termination of the addition of dilute sulfuric acid to the flask B. The reaction solution in the flask A was a slurry containing precipitated crystals of sodium azide.

The slurry reaction solution was rendered uniform with stirring. Part thereof was collected, and sodium azide precipitated was completely dissolved with the addition of deionized water. A reaction rate of hydrazine and a rate of sodium azide formed were then measured by titration and liquid chromatography. The reaction rate of hydrazine was about 70%, and the rate of sodium azide formed was about 95% relative to hydrazine consumed.

The obtained reaction solution was then concentrated. On that occasion, 1.86 liters (about 1.52 kg, about 42.8 mols) of methyl alcohol having purity of about 90% by weight was recovered as an initial fraction. Further, the reaction solution was concentrated under reduced pressure, and concentration stopped when the amount of the solution became about one-third. The sodium azide crystals precipitated were centrifugally filtered and separated from the filtrate containing the unreacted starting material to obtain 2.44 kg (purity of about 95% by weight) containing wet crystals. The yield of sodium azide relative to hydrazine consumed was 82.4%.

EXAMPLE 1

One hundred grams of commercial sodium azide (purity 99.7% by weight, a water content 0.1% by weight) were dissolved in 400 g of deionized water, and the solution was introduced into a spray dryer ["Mobile Minor Spray Dryer", a trademark for a dryer of Niro Atomizer K.K.] via a determination pump.

Spraying was conducted with this device by rotating a turbine perforated vertically relative to a rotary shaft at high speed, feeding a solution being sprayed to a hole near the root of the rotating turbine shaft and scattering the solution through the centrifugal force of the turbine. The rotary shaft of the turbine was set vertically, and the spraying direction therefore became horizontal. The hot water to evaporate the solvent was adapted to be blown against the scattered solution from above the turbine along the circumference of the turbine. The sodium azide particles formed were collected with a cyclone via a piping from the lower part of the dryer body, and the particles collected later were led to a bag filter.

The temperature of the hot water was set at 230° C., and the inside of the dryer was rendered normal. Then, a sodium azide aqueous solution was introduced in an amount of 300 ml/hr. The sodium azide aqueous solution introduced was collected with the cyclone within several seconds as sodium azide particles. After the introduction was over, heating with the hot water stopped, and the body was cooled, followed by recovering 99.0 g of the particles (purity 99.8% by weight, a water content 0.03% by weight) with the cyclone.

The obtained sodium azide particles were measured for a particle size distribution and photographed with a scanning-type electron microscope. The photos of the scanning-type electron microscope are shown in FIGS. 1 to 3. From said photos, it becomes apparent that the particles have a spongy structure containing traces of coarse particles considered to be dried and solidified in a scattering port, but are composed mainly of nearly spherical sodium azide fine particles. The sodium azide particles have a particle size distribution of 7 to 250 microns and a volume average particle size of 53 microns.

Next, self-decomposition characteristics to evaluate vigorous decomposition of sodium azide were measured by a test with a pressure container using a 9 mmø orifice plate for evaluation of dangerous articles in the Fire Law. Decomposition of the sodium azide fine particles was very mild without burst of the rupture disk in any of ten tests, and took about 3 seconds.

The shape, purity, water content, volume average particle size, particle size ratio, specific surface area, shape factor, amount of the absorbed oil and self-decomposition characteristics of the obtained sodium azide particles are shown in Table 1.

EXAMPLE 2

Sodium azide particles were obtained as in Example 1 except that the temperature of the hot air was 200° C. The particle size distribution was measured, and the amounts of the particles of the different shape having the particle size of 300 microns or more were about 0.8% by weight, and the particle size distribution was almost the same as in Example 1. The shape, purity, water content, volume average particle size, particle size ratio, specific surface area, shape factor, amount of the absorbed oil and self-decomposition characteristics are shown in Table 1.

EXAMPLE 3

Sodium azide fine particles were obtained as in Example 1 except that 105 g of wet crystals (purity about 95% by weight) of sodium azide formed in Referential Example were dissolved in 400 g of deionized water. The particle size distribution was measured, and found to be almost the same as in Example 1. The shape, purity, water content, volume average particle size, particle size ratio, specific surface area, shape factor, amount of the absorbed oil and self-decomposition characteristics of the resulting sodium azide particles are shown in Table 1.

COMPARATIVE EXAMPLE 1

Using commercial sodium azide (purity 99.7% by weight, a water content 0.1% by weight), self-decomposition characteristics were measured as in Example 1. As a result, decomposition of said sodium azide explosively occurred, and the rupture disk was bursted every time which was quite dangerous. The shape, purity, water content, volume average particle size, particle size ratio, specific surface area, shape factor, amount of the absorbed oil and self-decomposition characteristics of the sodium azide particles used are shown in Table 1.

COMPARATIVE EXAMPLE 2

Using fine particles obtained by pulverizing the same commercial sodium azide as used in Comparative Example 1 with a jet mill ["Single Truck Mill STJ-100 (FS-4)": a trademark for a machine of Seishin Kigyo K.K. ], self-decomposition characteristics were measured as in Example 1. Consequently, decomposition of sodium azide explosively occurred, and the rupture disk was bursted every time which was quite dangerous. The shape, purity, water content, volume average particle size, particle size ratio, specific surface area, shape factor, amount of the absorbed oil and self-decomposition characteristics of the sodium azide particles used are shown in Table 1.

TABLE 1

| | | | | | Volume average particle size ratio in ultra-sonic dispersion treatment | Specific surface area by BET method ($m^2/g$) | Shape factor (k) |
|---|---|---|---|---|---|---|---|
| | Shape | Purity (%) | Water content (wt. %) | Volume average particle size (μ) | | | |
| Example 1 | spongy and mainly nearly spherical | 99.8 | 0.03 | 53 | 0.27 | 0.62 | 60 |
| Example 2 | spongy and mainly nearly spherical | 99.8 | 0.03 | 48 | 0.30 | 0.66 | 58 |
| Example 3 | spongy and mainly nearly spherical | 99.9 | 0.03 | 52 | 0.33 | 0.62 | 59 |
| Comparative Example 1 | plate-like crystal aggromerate | 99.7 | 0.1 | 110 | 0.77 | 0.18 | 36 |
| Comparative Example 2 | fine crystals | 99.6 | 0.05 | 14 | 0.95 | 0.59 | 15 |

| | Properties of sodium azide particles Amount of the absorbed oil (g/100 g) | Self-decomposition characteristics Number of bursts (decomposition time) | Group in class 5 of dangerous articles in Fire Law |
|---|---|---|---|
| Example 1 | 16.3 | 0/10 (3 sec.) | 2 |
| Example 2 | 17.3 | 0/10 (3 sec.) | 2 |
| Example 3 | 16.0 | 0/10 (3 sec.) | 2 |
| Comparative Example 1 | 4.2 | 10/10 (explosion) | 1 |
| Comparative Example 2 | 13.8 | 10/10 (explosion) | 1 |

Effects of the Invention

From the results shown in Table 1, it follows that vigorous decomposition of the commercial sodium azide particles occurs, and the rupture disk is bursted every time in the test for self-decomposition characteristics. Said particles are thus classified in class 5, group 1 of dangerous articles in the Fire Law in Japan (Comparative Example 1), and therefore undergo strict regulation in quantities, package mode, etc. in transportation. On the other hand, decomposition of the sodium azide fine particles taking the nearly spherical shape and having the spongy structure in this invention requires 2 to 6 seconds and is quite mild. The number of bursts in the test for self-decomposition characteristics is zero, and the particles are classified in class 5, group 2 of dangerous articles in the Law (Examples 1 to 3). Accordingly, said particles are relatively mild in regulation such that compared to the commercial particles, they can be transported in quite large amounts with quite simple package mode; their handling is quite simple compared to the commercial particles.

Further, since the sodium azide particles of this invention have the spongy structure, they have nearly the same specific surface area as the commercial particles having the average particle size of about 8 to 15 microns, even though the volume average particle size is 40 to 80 microns, for example. Still further, the particles can be pulverized to the average particle size of about 5 to 25 microns quite easily and safely by a mere procedure using, e.g., a mixer or a blender. Furthermore, when produced by spray-drying, purity and pH of the obtained sodium azide particles can be controlled quite easily. Owing to such outstanding characteristics, said particles are quite useful as a gas generating agent for an air bag which is an automobile safety device.

What we claim is:

1. Alkali metal azide particles comprising particles at least 70% of which have a substantially spherical shape and wherein said alkali metal azide particles have a spongy structure and a volume average particle size ratio of 0.4 or less after an ultrasonic dispersion treatment at 26 KHz for 5 minutes.

2. The alkali metal azide particles of claim 1, wherein said particles have a volume average particle size of from 10 to 150 microns and a specific surface area measured by a BET method of from 0.4 to 1.0 $m^2/g$.

3. The alkali metal azide particles of claim 2 wherein said particles have a volume average particle size of from 20 to 100 microns and a specific surface area measured by the BET method of from 0.45 to 0.9 $m^2/g$.

4. The alkali metal azide particles of claim 3, wherein the volume average particle size of said particles is from 40 to 80 microns.

5. The alkali metal azide particles of claim 1, wherein at least 80% of said particles have a substantially spherical shape.

6. The alkali metal azide particles of claim 1, wherein at least 90% of said particles have a substantially spherical shape.

7. The alkali metal azide particles of claim 1, wherein said volume average particle size ratio of said particles is 0.35 or less after ultrasonic dispersion treatment at 26 KHz for 5 minutes.

8. The alkali metal azide particles of claim 1, wherein said particles are selected from the group consisting of lithium azide, sodium azide, and potassium azide.

9. The alkali metal azide particles of claim 1 substantially as shown in FIGS. 1 to 3.

10. A process for producing alkali metal azide particles, having a substantially spherical shape, a spongy structure, and a volume average particle size ratio of 0.4 or less after an ultrasonic dispersion treatment at 26 KHz for 5 minutes which comprises spray-drying an aqueous solution of an alkali metal azide.

11. The process according to claim 10, wherein said aqueous solution is obtained by adding crystalline sodium azide having a purity of at least 97% to an aqueous solvent.

12. The process according to claim 11, wherein the sodium azide is present in the aqueous solution in an amount up to its saturated concentration.

13. The process according to claim 10, wherein the concentration of the alkali metal azide in the aqueous solution is from about 5 to 30% by weight.

14. The process according to claim 10, wherein the concentration of the alkali metal azide in the aqueous solution is from about 10 to 25% by weight.

15. The process according to claim 10, wherein the aqueous solution further comprises up to 1% by weight of a surface active agent.

16. The process according to claim 10, wherein the spray drying is carried out by spraying the aqueous solution of the alkali metal azide in hot air at a temperature of from about 100° to 280° C.

17. A process for producing alkali metal azide particles having a substantially spherical shape, a spongy structure, and a volume average particle size ratio of 0.4 or less after an ultrasonic dispersion treatment at 26 KHz for 5 minutes, said process comprising dissolving an alkali metal azide in an aqueous solvent to form an azide solution and lyophilizing said azide solution.

18. An air safety bag for automobiles, said bag containing as a gas generating agent alkali metal azide particles having a substantially spherical shape and a spongy structure, and said particles having a volume average particle size ratio of 0.4 or less after an ultrasonic dispersion treatment at 26 KHz for 5 minutes.

* * * * *